UNITED STATES PATENT OFFICE.

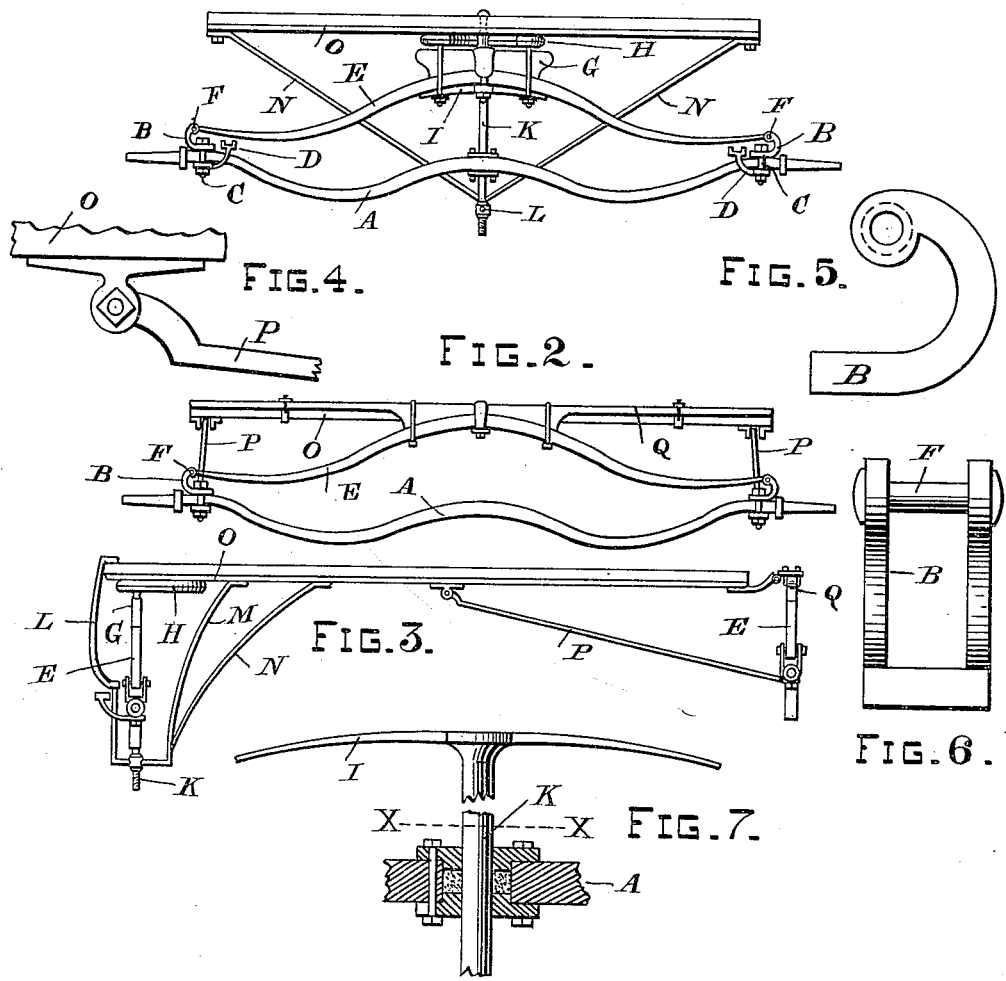

ENOCH WHITMORE, OF SAN FRANCISCO, CALIFORNIA.

RUNNING-GEAR FOR VEHICLES.

SPECIFICATION forming part of Letters Patent No. 249,814, dated November 22, 1881.

Application filed April 22, 1881. (No model.)

*To all whom it may concern:*

Be it known that I, ENOCH WHITMORE, a citizen of the United States, and residing at San Francisco, in the county of San Francisco and State of California, have invented certain new and useful Improvements in the Running-Gear of Vehicles, of which the following is a specification.

My invention relates to improvements in the running-gear of vehicles, and more particularly of that class of vehicles in which it is desirable to combine great lightness of construction with strength and resilience of action.

Figure 1 is a front elevation of the front axle and connecting parts. Fig. 2 is a rear view of the rear axle. Fig. 3 is a side view, showing the relative position of the front and rear axles with the body of the wagon. Fig. 4 is a side view, showing the manner of connecting the rear stay-rods with the body of the vehicle. Fig. 5 shows a side view of the spring-clip. Fig. 6 shows an end elevation of the same. Fig. 7 is a sectional detail view, showing the king-bolt and the bearing provided for it in the axle. Fig. 8 is a plan view on line X X of Fig. 7.

Similar letters refer to similar parts throughout the several views.

To the outer ends of the axle A, I attach the spring-clip B by means of bolts C, passing down on either side of the axle A, and through the shaft-coupling D, and firmly held to place by nuts.

The springs E, which are to be constructed in the form shown or that known as "double sweep" or "side" springs are held in position by bolts F, which pass through the outer ends of said springs and through the upwardly-projecting ears or lugs of the spring-clip B, and are headed down upon the exterior faces of said ears.

To the upper central portion of the front spring I connect the head-block G and fifth-wheel H, which are clamped and secured to place in the usual manner. The shanks of the clips which hold the head-block in place pass through the flange I of the king-bolt K and firmly clamp it to the under side of the spring E. The stem of the king-bolt K passes downwardly and extends through the axle A, which is provided with a stuffing-box, through which the said stem plays, as is clearly shown in Fig. 7.

From the lower end of the king-bolt extend the stay-rods L M and N N, which extend upwardly and are bolted to the bed O at any convenient points.

The axles are given about the same degree of curvature as that of the springs. The rear spring is secured to the rear axle in the same manner as the forward spring is secured to its axle, and at the point corresponding to that at which the shaft-coupling is secured to the front axle I attach the stay-rods P P, which extend forward and are secured to the body of the vehicle by a hinge-joint, as is clearly shown at Fig. 4.

To the upper portion of the spring I attach the cross-bar Q, which supports by hinged connections the rear end of the bed, as seen in Fig. 3.

Having thus described my invention, what I claim, and desire to secure by Letters Patent, is—

In a vehicle, the combination of the axles A, transverse springs E, head-block G, fifth-wheel H, flanged king-bolt K, and body O, braced by suitable stay-rods, all constructed and arranged substantially as and for the purpose shown and described.

In testimony that I claim the foregoing I have hereunto set my hand and seal this 22d day of March, 1881.

ENOCH WHITMORE. [L. S.]

Witnesses:
  CHAS. E. KELLY,
  WILMER BRADFORD.